(12) United States Patent
Scott et al.

(10) Patent No.: US 7,679,786 B2
(45) Date of Patent: Mar. 16, 2010

(54) COLOR CORRECTION METHOD

(75) Inventors: Kevin C. Scott, Rochester, NY (US);
Gregory J. Wolfe, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 716 days.

(21) Appl. No.: 11/470,618

(22) Filed: Sep. 6, 2006

(65) Prior Publication Data
US 2008/0055616 A1      Mar. 6, 2008

(51) Int. Cl.
H04N 1/40        (2006.01)
(52) U.S. Cl. .................................. 358/2.1; 358/504
(58) Field of Classification Search .............. 358/1.9, 358/2.1, 500, 504, 518, 520; 382/162, 167
See application file for complete search history.

(56) References Cited

U.S. PATENT DOCUMENTS

| | | | |
|---|---|---|---|
| 4,928,167 A | 5/1990 | Tatsumi et al. | |
| 5,157,740 A | 10/1992 | Klein et al. | |
| 5,751,848 A | 5/1998 | Farrell | |
| 5,913,019 A | 6/1999 | Attenberg | |
| 6,222,642 B1 | 4/2001 | Farrell et al. | |
| 6,278,800 B1 | 8/2001 | Madden et al. | |
| 6,323,957 B1 | 11/2001 | Ball | |
| 6,608,926 B1 | 8/2003 | Suwa et al. | |
| 6,868,179 B2 * | 3/2005 | Gruzdev et al. | 382/167 |
| 6,898,312 B2 | 5/2005 | Schroder | |
| 6,912,313 B2 | 6/2005 | Li | |
| 6,950,130 B1 | 9/2005 | Qian | |
| 6,999,113 B1 | 2/2006 | Omura | |

(Continued)

FOREIGN PATENT DOCUMENTS

EP              0 595 353 A1     5/1994

(Continued)

OTHER PUBLICATIONS

Gary Starkweather, Colorspace Interchange Using sRGB, found at: white.stanford.edu/~brian/psy221/reader/Starkweather.sRGBWhitePaper.pdf.

(Continued)

*Primary Examiner*—Thomas D Lee
*Assistant Examiner*—Stephen M Brinich
(74) *Attorney, Agent, or Firm*—Kathleen Neuner Manne; David A. Novais; Eugene I. Shkurko

(57) ABSTRACT

A method and apparatus for adjusting a color in an image to a desired color value is described, wherein the method includes identifying at least a first portion of the image including the color to be adjusted; analyzing the first portion to determine a representative color value; determining a color adjustment parameter to adjust the representative color value to the desired color value; and applying the color adjustment parameter to at least the first portion of the image. The method can further include performing a desaturation of the first portion of the image before analyzing to determine a color value, and resaturating the color value; identifying at least a second portion of the image having a color value extreme to determine a color value representative of the color value extreme, and using the second portion color value in determining the color adjustment parameter; or a combination thereof.

19 Claims, 7 Drawing Sheets

U.S. PATENT DOCUMENTS

| | | |
|---|---|---|
| 2002/0159080 A1 | 10/2002 | Feng et al. |
| 2003/0043394 A1 | 3/2003 | Kuwata et al. |
| 2004/0052429 A1 | 3/2004 | Curry et al. |
| 2004/0071343 A1 | 4/2004 | Yamazoe et al. |

FOREIGN PATENT DOCUMENTS

| | | |
|---|---|---|
| GB | 2352354 | 1/2001 |
| WO | 94/26057 | 11/1994 |
| WO | 2006/065091 | 6/2006 |

OTHER PUBLICATIONS

Michael Stokes.Matthew Anderson/Srinivasan Chandrasekar/Ricardo Motta, A Standard Default Color Space for the Internet—sRGB, Version 1.10, Nov. 5, 1996, found at: http://www.w3.org/Graphics/Color/sRGB.

* cited by examiner

COLOR CORRECTION METHOD

FIELD OF THE INVENTION

The invention relates generally to the field of digital photo image processing and printing, and in particular to a method of color correction when a specific color is required or desired in an image.

BACKGROUND OF THE INVENTION

Many images, whether captured digitally or on traditional film, are subject to color discrepancies or variances from what the consumer expects to see, or from legally required color schemes. This can be due to, for example, incorrect photographic settings on the part of the consumer resulting in, for example, under- or over-exposing an image, improper lighting, color scene variances due to film type, development processing, print stock coloration, or use of poor-performing cameras. Further, what the human eye sees can be different from the range of colors recorded digitally or on film. In particular, the human visual system recognizes colors in relation to adjacent colors and in accordance with lighting conditions, whereas digital and film photography attempt to record the actual color of an object.

Images that have areas of white or black may appear different on a monitoring screen or in print than what the consumer expects. For example, photographic identification (ID) images for use in official documents such as driver's licenses, passports, and other identification documents, are intended to have a white background, but often appear to have a slightly colored background, whether a neutral color (for example, white, black, or gray) or colored (for example, blue-tinted or red-tinted). Snow or ice scenes can appear overall blue. It is noted that snow and ice in nature frequently do have a blue or green tint, however consumers expect to see a more white coloration of snow and ice. Darkly shaded scenes, such as forest or cave images, also are frequently distorted toward a certain color, for example, green due to foliage, and red or yellow due to lighting conditions, respectively. Other colors can also be distorted from consumer expectations.

Color balancing, altering both the color and brightness of an image, is often used to attempt to correct unwanted colorations, but can result in other coloration variances that are unacceptable. Traditional automatic scene balance algorithms tend to adjust the exposure so that the average color of the image is a neutral gray, which is acceptable for many consumer photographic images, but not for particular scenes or for meeting legal coloration requirements. For example, simply balancing a photographic ID image to make the background white frequently distorts the coloration of the subject's face, hair, and eyes, and may brighten the face so the features are washed out. Alternately, balancing towards a neutral gray color in such a scene can be affected by the coloration of the subject's clothing, for example, and produce a tinted background. Similarly, removing some of the blue from a sky, snow, or ice scene may improperly remove blue tint from other objects, such as people, cars, buildings, and foliage, altering the coloration beyond an acceptable level. This is also true for images with dark shadows. To lighten or alter the color of the shadows may affect the entire image by making it too bright, or by shifting the color of other areas of the image unacceptably. Similar unacceptable results may occur when color balance is done to correct skewing of other colors.

Color balance and other processing techniques can be done automatically by a camera, video recorder, or other imaging apparatus during or after recording an image, or during initial processing of the image, whether by physical, optical, or digital processing. Such processing may also negatively affect the resulting image, for example, by skewing the color balance based on a color that occupies much of the image, or increasing saturation levels of colors such that desirably neutral-colored areas are affected.

Color balance and achievement of a desired color in an image that is representative of the real color of the subject, or of an expected color of the subject is important in many different industries. Photographic ID images, consumer and professional photographs, and advertising media are just some examples of industries wherein color is extremely important. For example, the success of an advertisement for a clothing line, food item, corporate logo, or sports team relies on achieving an expected realistic coloration of the subject. Regardless of the final format of the image, whether achieved by display on a monitor, in print media, on a photographic medium, or some other media, it is desirable to control the visual characteristics of the image.

Methods of adjusting the backgrounds of images or scenes are known for use in document handling and photographic industries. In document handling, artifacts from copying or handling can be removed by forcing the background toward white, as described, for example, in U.S. Pat. Nos. 6,323,957; 6,222,642; and 5,157,740. In the photographic industry, particularly for photographic identification images, separation of the background from the subject, and replacement of the background with a desired image or color, is known, as described, for example, in U.S. Pat. Nos. 6,999,113; 6,950,130; 6,912,313; and 5,913,019, and WO 94/26057. Methods of transforming color-image signals while maintaining shadow and highlight characteristics are addressed in U.S. Pat. No. 6,278,800. U.S. Pat. No. 6,608,926 describes a color fog correction wherein the area of interest is removed before correction. U.S. Patent Application Publication US 2004/0071343 describes methods of correcting color fog in images using LCC color space conversions. U.S. Pat. No. 4,928,167 similarly describes tonal corrections for video signals using conversion to LCC color space.

It is desirable to have a means of correcting for a specific color within an image when a desired value of the specific color is known.

SUMMARY OF THE INVENTION

The invention is directed to a method of adjusting a color in a digital image to a desired color value, wherein the method comprises:

identifying at least a first portion of the image, wherein the first portion comprises the color;

analyzing the first portion to determine a color value representative of a first portion color;

determining a color adjustment parameter for the color value to adjust the color value to the desired color value;

applying the color adjustment parameter to at least the first portion of the image;

wherein the method further comprises one or more of:

performing a desaturation of the first portion of the image before analyzing the first portion to determine a color value, and resaturating the color value; and identifying at least a second portion of the image, wherein the second portion has a color value extreme, analyzing the second portion to determine a color value representative of the color value extreme, and using the second portion color value in determining the color adjustment parameter.

Alternately, the method of adjusting a color in a digital image to a desired color value can comprise:

identifying at least a first portion of the image, wherein the first portion comprises the color;

analyzing the first portion to determine a color value representative of a first portion color in at least one color channel;

determining a color adjustment parameter for the color value in each of the at least one color channel to adjust the color value to the desired color value;

applying the color adjustment parameter in each of the respective at least one color channel to at least the first portion of the image;

wherein the method further comprises one or more of:

performing a desaturation of the first portion of the image in each of the at least one color channel before analyzing the first portion to determine a color value in each of the at least one color channel, and resaturating the color value in each of the at least one color channel; and identifying at least a second portion of the image, wherein the second portion has a color value extreme, analyzing the second portion to determine a color value representative of the color value extreme in each of the at least one color channel, using the second portion color value for each of the at least one channel in determining the color adjustment parameter for each of the respective at least one color channel.

The invention further includes a system for adjusting color images, wherein the system comprises:

a computer having a memory for storing at least one color image and at least one adjusted color image;

a display for displaying at least one color image, at least one adjusted color image, or both;

an input device for accepting at least one color image for adjustment, wherein the input device is communicably connected to the memory;

an output device for the at least one adjusted color image;

wherein the computer analyzes at least a first portion of at least one color image in memory from the input device, wherein the first portion comprises a color for adjustment; analyzes the first portion to determine a color value representative of a first portion color; determines a color adjustment parameter for the color value to adjust the color value to a desired color value; and applies the color adjustment parameter to at least the first portion of the image stored in the memory; and wherein the computer further desaturates the first portion of the image before analyzing the first portion to determine a color value, and resaturates the color value; or identifies at least a second portion of the image wherein the second portion has a color value extreme, analyzes the second portion to determine a color value representative of the color value extreme, and uses the second portion color value in determining the color adjustment parameter.

ADVANTAGEOUS EFFECT OF THE INVENTION

The present invention enables adjustment of a specific color in an image to a desired color. This enables correction of an image to meet legal specifications, to better reflect the actual color of the original subject, or to adjust to consumer expectations or desires. This can correct improper previous processing, for example, poor color balance and exposure settings on the imaging processing, for example, poor color balance and exposure settings on the imaging apparatus. This can be done without unacceptably altering other colors or brightness levels within the image.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

Figure 1:
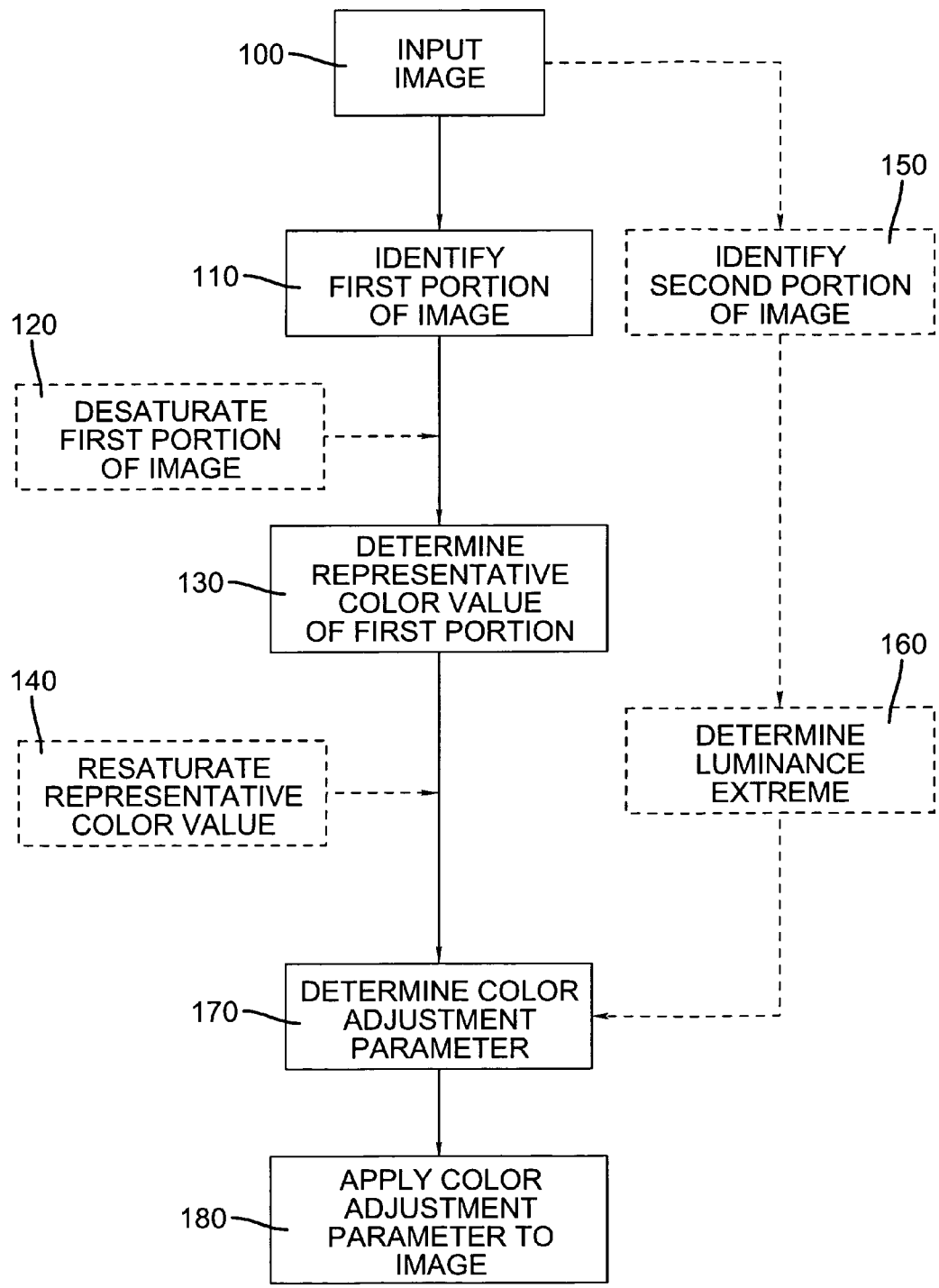
FIG. 1 is a block diagram of the invention.

The figures are exemplary only, other embodiments of the invention being apparent from the description below.

DETAILED DESCRIPTION OF THE INVENTION

The invention enables adjustment of a specific color in an image to a desired color. Adjustment of one or more colors within an image can be done to better match the final image appearance on an output media to the original subject color, to customer expectation of the color, or to meet legal requirements.

As known in the photographic arts, the color space utilized to represent the color of the subject can be dependent on the equipment used to capture the image, store the image, manipulate the image, or render the image for output, such as to an electronic display device, print media, or photographic media, or can be a pre-defined, device-independent color space. Examples of various color spaces can include, but are not limited to, RGB (red-green-blue) or variant color spaces like sRGB color space, CMY (cyan-magenta-yellow) and CMYK (cyan-magenta-yellow-black) color space, L*a*b* color space, luminance-chrominance color spaces such as but not limited to $YC_rC_b$, XYZ color space, and linear or log metrics such as linear or log reflectance, linear or log radiance, and linear density metrics. Each color space can have two or more color channels, one for each color or characteristic, for example, luminance or brightness, of the color space. For example, RGB color space can be divided into three color channels, one each for the amount of red, blue, and green for each segment, or pixel, of the image. For CMYK color space, up to four color channels could be used, one each for cyan, magenta, yellow, and black. $YC_rC_b$ color space can have three channels, luminance and two chroma channels. Depending on the desired color adjustment, one or more channels for the given color space can be used, which can be considered the color channel(s) of interest. All chrominance channels can be used.

To adjust a color or brightness (exposure), color space values can be first transformed to a mathematical metric easier to manipulate, such as linear or log reflectance, linear or log radiance, or linear density. A color adjustment parameter can then be applied to the image pixel values of the metric, and then the adjusted image can be converted back to the working color space, or a different color space as desired. For example, to convert an image between an RGB color space as it is stored and a CMYK color space used by a printer, the RGB image can be converted to a linear reflectance metric, adjusted as needed to obtain a desired color or brightness adjustment, converted back to the RGB space, and then converted into the CMYK color space, thereby enabling the print output to better approximate the desired color in the image. Such conversions are based on an assumed rendering curve, with the respective conversions to and from a particular color space being inverses of each other.

Images are typically stored as digital information, and are encoded into binary numbers for storage and manipulation by electronic devices such as computers. The pixels of the image typically are thought of as representing real numbers from 0.0 to 1.0. To be represented as binary numbers by a computer, each color must be assigned a certain number of bits as a coded value. Eight bit representation (00000000 to 11111111) results in 256 possibilities, which are equivalent to the values ranging from 0 to 255. Thus, the original pixel values of 0.0 to 1.0 are scaled by 255 for representation in an 8-bit system. If more refinement is required, a larger bit system can be used, typically a 12 bit system, wherein each pixel value is scaled by 4095. For use with various linear and log metrics, the 12-bit system achieves good results, although use of a system with fewer representative bits may achieve acceptable results.

Figure 2:
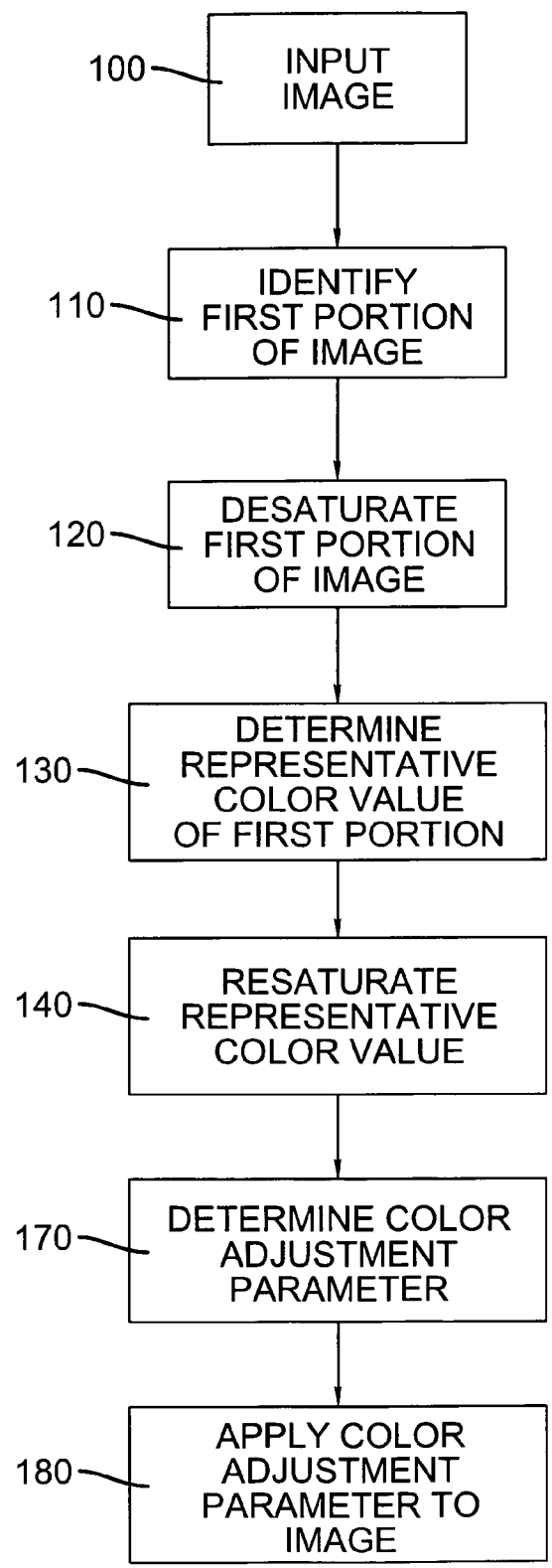
FIG. 2 is a block diagram of a first method of the invention.
Figure 3:
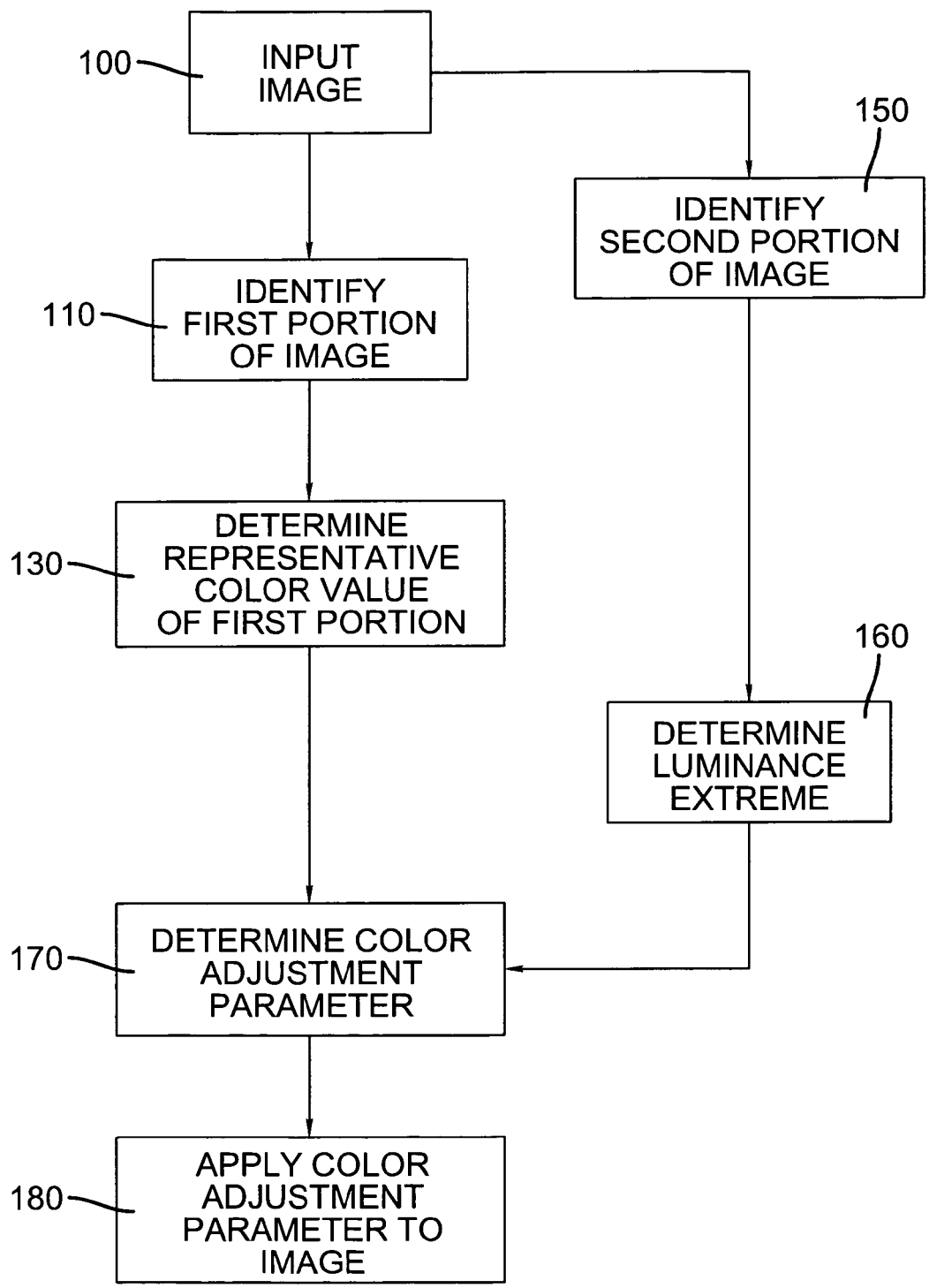
FIG. 3 is a block diagram of a second method of the invention.
Figure 4:
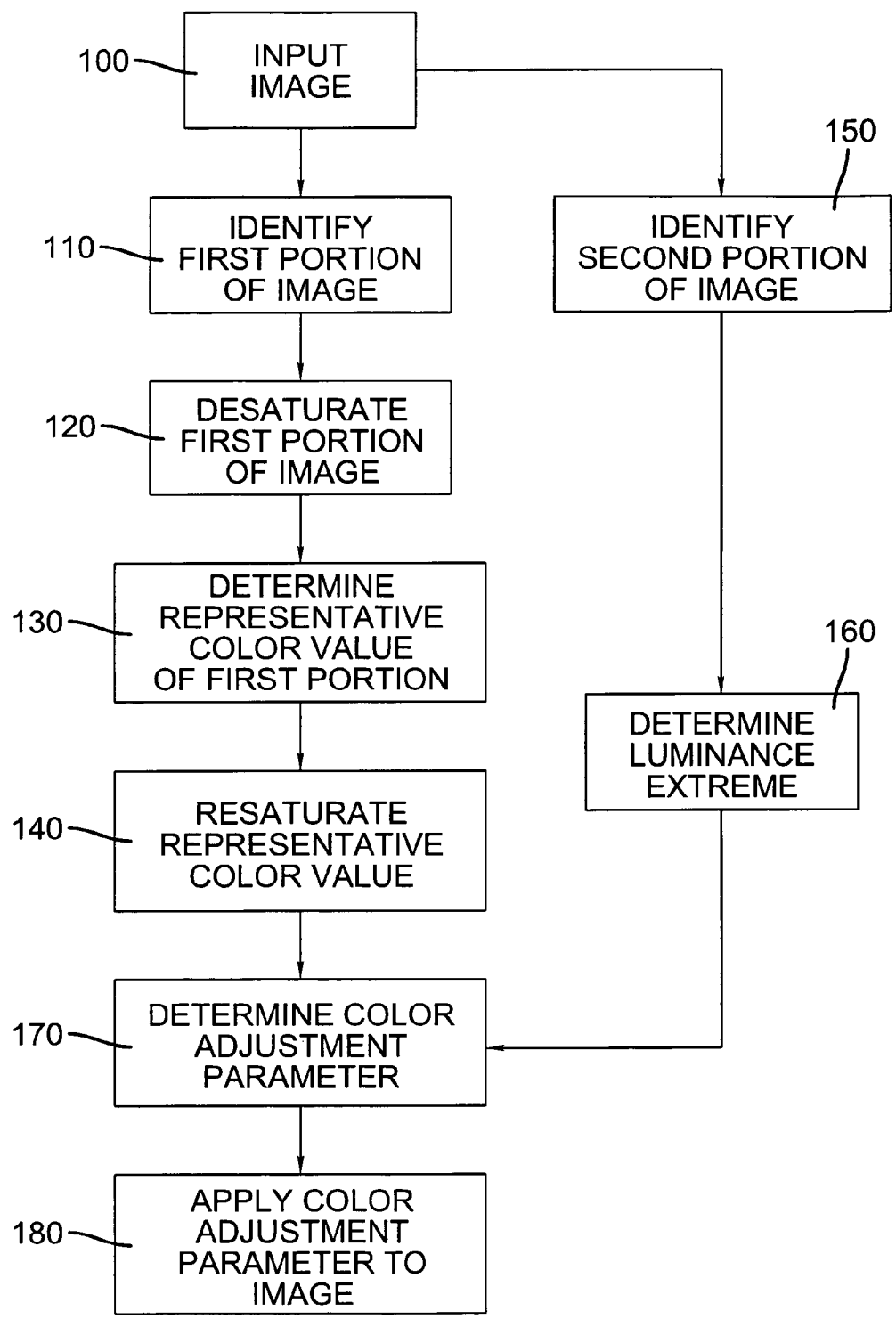
FIG. 4 is a block diagram of a third method of the invention.

The method of the invention will be described with reference to the figures, wherein like numerals indicate the same or similar steps. FIG. 1 shows an overview of the invention, with specific alternate pathways being shown in FIGS. 2-4.

The method of adjusting the color value of an image includes inputting an image 100 into a system having a memory, such as a computer. The image can originally be, for example, a digital image from a camera, a portable memory device, transferred from a networked or communicable location or device, or scanned in from a print, negative or positive film, or developed photograph. Any means of obtaining a digital image can be used.

A first portion of the image is identified 110. The first portion can be identified automatically by any preprogrammed method, for example, a predetermined location, shape recognition, facial detection, pattern detection, scene detection, image segmentation, or other known methods of autodetecting image subject matter. If an automatic identification is made, such an identification can be indicated on a display to a user for confirmation or adjustment, if desired. Alternately, the user can make the determination by clicking or pointing to at least one area on the screen by use of a mouse, joystick, touch-sensitive screen, optical mouse, or other known indicative methods to identify the user-designated area. The user can select a specific point of the image, or indicate one or more area of interest, for example, by drawing a geometric shape or irregular shape around the area or areas of interest. Semi-automated detection procedures can be used to modify an area designated by the user. For example, a jagged line drawn by the user can be automatically smoothed The first portion can be the entire image, or an area of the image, for example, 50%, 25%, or less of the image area, or can be a combination of areas, for example, two corner portions of the image. If more than one area of the image is designated as a first portion, the areas can be contiguous or non-contiguous within the image.

Once the first portion of the image is identified 110, the first portion of the image is analyzed to determine a representative color value of the first portion 130. The analysis can be done by any method known in the art. For example, the range of color values in each color channel for the first portion of the image can be determined, for example, by using a histogram. A histogram is considered to be the data corresponding to the frequency of occurrence of pixel values, regardless of data format, for example, graphical form, tabular form, or matrix.

A cumulative histogram can be used. If a histogram is used, individual histograms for each color channel of interest can be taken, or a combined histogram of the channels of interest can be taken. A representative color value can be determined from the analysis automatically, or by the user. Automatic determination can include selecting a predefined percentage point of the histogram. This percentage point can vary with the certainty that the first portion contains only the desired color value. The automatically selected representative color value can be provided to a user for confirmation or adjustment by displaying the color, or its representative numerical value, on a display. Alternately, the, colors or representative numerical values over a selected range or the entire range of the first portion of the image can be presented to the user for selection of a representative color value. A representative color value can also be preprogrammed based on data from a representative sample of images, negating the necessity of performing a histogram or like function in the determination step for each image.

Alter the representative color value of the first portion is determined, a color adjustment parameter for the representative color value is determined 170, wherein the color adjustment parameter is sufficient to adjust the representative color value to a desired color value. The color adjustment parameter can be, for example, a scaling factor or an offset. The appropriate color adjustment parameter can be determined in view of the representative color value, desired color value, and color space.

Once the color adjustment parameter is determined, it can be applied to at least the first portion of the image 180, thereby adjusting the color value of at least the first portion of the image. The color adjustment parameter can be applied to the entire image, or one or more selected portions of the image as desired. If applied to only a portion of the image, any of various techniques can be used, including image segmentation, shape recognition, facial detection, pattern detection, and scene detection. For example, a pixel-by-pixel analysis can be done to determine the difference in color value of the pixel from the desired color. Individual pixels can be changed to the desired color or according to the color adjustment parameter; moved closer in value to the desired color, for example, using some fraction of the color adjustment parameter; or left unchanged dependent on the difference in value of the pixel from the desired color.

To better determine the representative color value, it can be desirable to first desaturate the first portion of the image 120 before determining a representative color value. After the representative color value is determined, the representative color value is then resaturated 140 for use in determining the color adjustment parameter. Desaturation and resaturation allow extremes in color Values to be de-emphasized, which can make determination of the representative color value more accurate. Desaturation can include identifying a saturation extreme of the image, and tuning the desaturation factor to account for the saturation extreme. "Saturation" is the difference between a color value and a color-neutral. "Color-neutral" can be where all color channels are of the same value in a standard red-green-blue (sRGB) color space including a particular reference white, or equivalent color in an alternate color space having a different or the same reference white, sRGB is explained, for example, in "A Standard Default Color Space for the Internet—sRGB" by Stokes et al., Nov. 5, 1996, found at:

http://www.w3.org/Graphics/Color/sRGB, and in "Colorspace Interchange Using sRGB" by Gary Starkweather, found at:

white.stanford.edu/~brian/psy221/reader/Starkweather.sRGBWhitePaper.pdf.

An example of a color-neutral is reference white, black, or any gray in RGB color space, and equivalents thereof in alternate color spaces. As used herein, "desaturate" and like terms means to move a given color value towards or to a color-neutral while keeping the brightness unchanged. "Resaturate" or like terms means moving a color value away from color-neutral. Resaturation can be an exact inverse of the desaturation operation, an approximate inverse of the desaturation operation, or unrelated to the desaturation operation.

To perform a desaturation or resaturation operation, the color space in which the image is provided can first be changed to a chrominance-luminance color space, desaturated or resaturated, and then converted back to the original color space. Separation of the chrominance values from the luminance enables more accurate adjustment of the chromatic portion of the color values, thereby enabling better differentiation of the first portion true color value and the color value of any features in the first portion that might undesirably affect the representative color value determination. Control of any adjustment of the luminance values is also achieved. For example, if a desired color adjustment is towards reference white, it can be desirable to reduce the luminance of the color channels during desaturation before determining the representative color value. Similarly, if a desired color adjustment is towards black, it can be desirable to increase the luminance of the color channels during desaturation before determining the representative color value. In either case, adjusting the luminance value by some amount increases the difference between the first portion true color value and the color value of any features in the first portion that might undesirably affect the representative color value determination, thereby increasing the effectiveness of the desaturation, and conversely the resaturation.

Alternatively or in addition to desaturation/resaturation of the first portion, a second portion of the image having an important feature can be identified 150. The second portion of the image can include a color value that is undesirable to clip, where "clipping" and like terms means loss of the color value because it is beyond the range of values an output device is capable of producing. Where a color value is clipped, the color value will be shown as the maximum color value the device is capable of producing, rather than the actual color value. Where color or brightness of a particular region of the image is the important color value, clipping of such color value is undesirable. Identification of a second portion of the image including the region not to be clipped can be done in the same manner as identification of the first portion of the image.

Once the second portion of the image is determined, the color value extreme within the second portion of the image is identified 160. The color value extreme can be determined in one or more individual color channel, and can be a maximum or minimum luminance from any channel that is desirably not to be clipped in the color adjusted image. The maximum and minimum values, if both are used, can be from the same or different color channels. Whether the maximum color value, minimum color value, or both, are selected can be preprogrammed based on the type of images expected to be processed, or can be selected by the user. Again, although use of the actual extreme value is usually desirable, this value could be selected or adjusted by a user, if desired.

Once the color value extreme is determined, it is used in combination with the first portion representative color value to determine the color adjustment parameter 170 such that the color adjustment parameter does not cause the color value extreme to be outside the range of the output device. The color adjustment parameter is then applied to at least a portion of the image 180, and in some cases, the entire image.

In determining the color value extreme, a desaturation and resaturation of the second portion of the image can be done. It should be noted that more than one additional portion of the image can be identified for determination of a color value extreme or alternate color value that should not be clipped. Any number of such values can be used with the representative color value of the first portion of the image for determination of the color adjustment parameter. For example, both a maximum and minimum value can be determined, neither of which should be clipped.

Other processing methods known in the art can be applied to the image. For example, a scene balance of the image can be applied once the above color adjustment method is performed, or before performing the color adjustment method. Any other adjustments similarly can be made before or after the color adjustment. In most cases, further adjustments are desirably made after the color adjustment in order to avoid clipping of important areas of the image, or alteration of the color value of the desired portion of the image beyond an acceptable range.

As an example of the invention, production of a photographic identification (ID) image will be examined. Such images typically require a "white" background. Using an RGB color scale, and an 8 bit representation, white is equivalent to a value of 255 in all color channels, red, green, and blue, as well as maximum brightness. It is unlikely that any background used for a photographic ID image will actually register as 255, in whole or in part. Therefore, it is desirable to force the coloration of the background as close to white as possible without unduly altering the appearance of the subject, because such alteration of the subject would compromise the use of the image for identification purposes.

To adjust the image, which can be taken using film or digital photography, a digitized version of the image is inspected to identify at least a portion of the image containing the background that is desired to be white. The identification can be done automatically by a program that searches for a predetermined location, shape recognition, facial detection, pattern detection, scene detection, image segmentation, color value, or other known methods of autodetecting image subject matter. Alternately, an operator can select a portion of the image by, for example, highlighting the portion with a graphic such as but not limited to a box, or pointing to the background section with a mouse or on a touch screen.

Once the background portion is identified, it is analyzed to determine a color value representative of the background. This can be done by taking a histogram of the identified first portion of the image in each color channel of the working color space. Other means of determining a representative color value can also be used, such as but not limited to selection of a mean or median value, or user choice of a value. In the exemplified case of the photographic ID image, it is presumed the background was approximately white to start. Thus, a value within the returned identified range of color values of the background can be chosen based on the certainty that the overall range of colors identified as "background" is truly the background portion of the image. For example, if a large portion of the image is used to analyze the background, for example, half the image, it may include portions that are not background, such as parts of the subject. Thus, a color value closer to white within the histogram should be taken, for example, the 85% or 90% point, as the representative color of the image background. Where a smaller sample is chosen that is more likely to represent only the background, for example, a top portion of the image, or one or two top corners of the image, or an area designated by the user, a median value can be taken as representative of the color of the image background, for example, 50% point. The percentage point chosen will be inversely proportionate to the certainty that only the desired portion of the image was analyzed. A different percentage point could be taken in each color channel, or the same percentage point across all color channels, as desired.

Once the color value representative of the background color is identified for each color channel, a color adjustment parameter is determined for each color channel. The color adjustment parameter appropriate to adjust the representative color value to the desired color value. For example, if the representative color value is 200, and a color value of 255 is desired, a scale factor of 1.275 will be required to achieve the color value of 255. The color adjustment parameter can be the same or different for each color channel. If the color adjustment parameter is desired to be the same for each channel, it can be derived from the average of the color adjustment parameters determined for each channel of interest.

The color adjustment parameter for each color channel, once determined, is applied to at least the identified portion of the image, and can be applied to the entire image. To be certain other areas of the image that are not background, which may have been included in the identified portion of the image, do not adversely affect the chosen representative background color, the portion of the image chosen can be desaturated before taking the histogram. Desaturation of each color channel of the identified portion of the image will scale down differences in color or brightness, lessening any effect on the representative color value. Once a representative color value in each color channel is chosen, that color value is resaturated to the original color scale and used to determine the color adjustment parameter for that color channel.

To ensure that other important areas of the image are not adjusted improperly by application of the color adjustment parameter chosen, the color adjustment parameter can be chosen in further consideration of the color or brightness level of another important feature of the image, such as the subject's face in case of a photographic ID image. A second portion of the image can be identified, again automatically or by an operator, and a histogram of the second portion can be taken. The second portion can be two or more areas of the image, which areas can be contiguous or non-contiguous within the image. The purpose of the histogram of the second portion is to identify a color value extreme in one or more of the color channels. The color value extreme for each color channel is adjusted by the determined color adjustment parameter before actually applying the color adjustment parameter to at least the first portion of the image. If the adjusted color value extreme value for any particular color channel would be outside the printable range of colors, the color adjustment parameter for all color channels are appropriately adjusted to keep the color value extreme, after adjustment within the visible or printable range of colors, thereby avoiding clipping of the color value extreme in any color channel. This will preserve, in the example of a photographic ID image, highlights on a person's face, or brightness of an article of clothing, while still permitting whitening of the background to a color close to, if not actually, white.

Figure 5B:
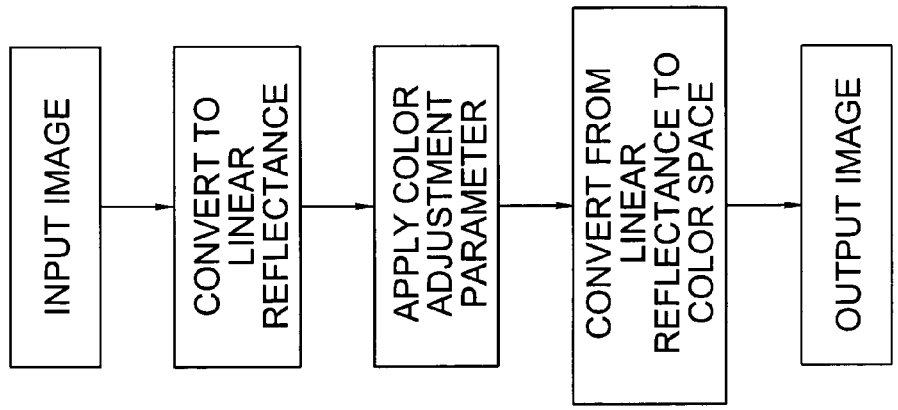
FIGS. 5a and 5b are block diagrams of alternate methods of applying a color adjustment parameter to an image.
Figure 5A:
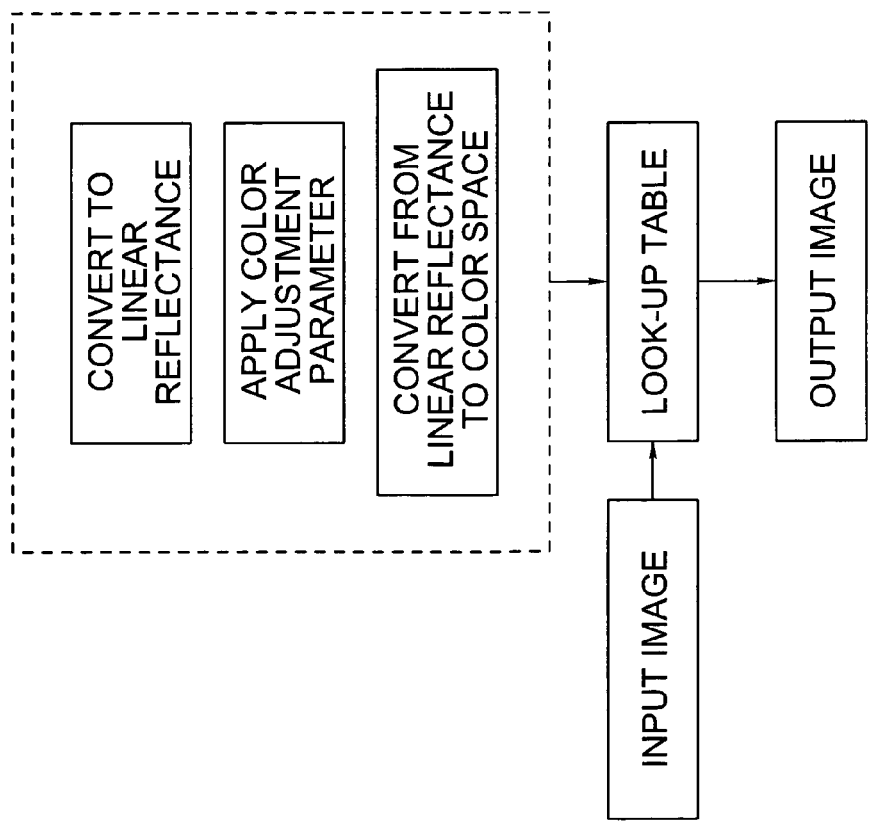
Figure 6:
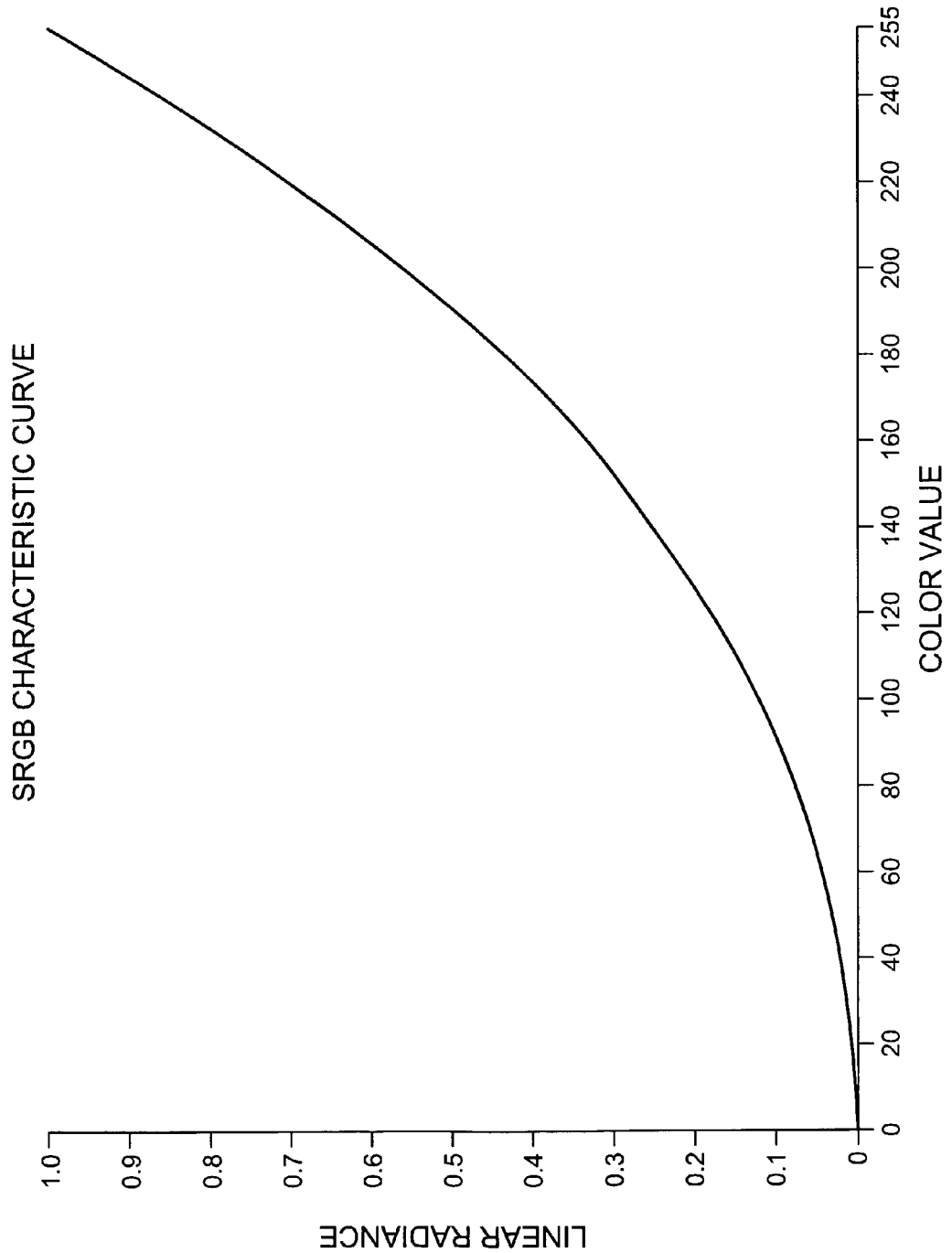
FIG. 6 is a graph of sRGB color value versus linear reflectance.

Although the above description applies the color adjustment parameter directly to the color values of the image in the working color space, which may be different from the color space in which the image was originally recorded, this may not be desirable. It is known in the art to convert images in various color spaces to a linear or log reflectance, linear or log radiance, or linear density before adjusting one or more of color balance and exposure. Thus, the above sequence becomes: determining a color value representative of a portion of the image; converting the color value to, for example, a linear- or log-reflectance; determining a color adjustment parameter in the linear- or log-reflectance metric based on the representative color value; converting the image to the linear- or log-reflectance metric; applying the color adjustment parameter to at least the first portion of the image in the linear- or log-reflectance metric; and converting the image back to the working color space. These steps can be applied directly to the image as a sequence of operations as shown in FIG. 5a, or by use of a look-up table (LUT) as shown in FIG. 5b for processing efficiency. The relation between color value and various linear- or log-metrics for a given color space can be determined as known in the art. As an example, a plot of color value versus linear reflectance of sRGB color space is shown in FIG. 6.

A LUT can have separate data for each of the color channels of an image. To build a single LUT for use, a first LUT for conversion of the image to linear or log reflectance, linear or log radiance, or linear density metric is prepared, the color adjustment parameter is applied to the first LUT, and the adjusted LUT values are converted back to the working color space, resulting in a single LUT that can be applied to the image data. Each image can have a unique LUT.

Alternately, a "standard" LUT can be prepared to improve the efficiency of the color adjustment process if it can be assumed that the photographic conditions are approximately equal for all images requiring color adjustment. For example, a photographic studio or kiosk used exclusively for photographic ID images should have consistent placement of the camera relative to the associated background, subject, and lighting source; consistent lighting; and a set background. An image of the background could be taken and used to determine an appropriate LUT for making the background appear white, which LUT would then be applied to all photographic ID images taken with that set-up. This will not account for variations in saturation or brightness of a subject's clothing or face, and therefore may result in some clipping of the subject, but the LUT can be based on a color adjustment parameter that causes the background to be acceptably white without unduly clipping many facial features or clothing colors. This can be determined, for example, from a sample of photographic ID images, wherein a median color adjustment parameter, or other value as determined appropriate, is determined based on the color adjustment parameter needed to prevent clipping in all sampled photographic ID images. Again, this type of LUT can be prepared for any series of images produced under similar or identical conditions, such as lighting and distance from subject, for example, underwater images. Best results will be achieved when the color adjustment parameter is determined on an image-by-image basis, but efficiency and reliably acceptable results can be achieved with a pre-programmed LUT to apply to all similarly taken images.

Where the color space is non-linear, or where it is defined such that the reference white has unequal color channel values, normalization of the color values can be done before the adjustment steps of analyzing the first portion or before desaturating, and conversion back to the original color space can be done after identifying the color value representative of the first portion, or after resaturation of such representative color value.

For convenience, any starting color space can be converted to another color space in which to work. For example, a luminance-chrominance color space can be converted to RGB or sRGB for adjustment of the color values. The converted color space can be further converted to linear reflectance or log reflectance, linear radiance or log radiance, or linear density, for ease of calculations.

It should be apparent from the above description that this process is useful for preserving shadows as well as highlights. Black or other dark colors can be made to approach the desired black color value in a similar manner to that in which an identification photograph background was made to approach white, whereby the image undergoes a blackening effect in the darkly colored areas. Also, other desired colors in an image can be forced to a specific color if desired using the techniques described herein, for example, making water a specific shade of blue-green.

Figure 7:
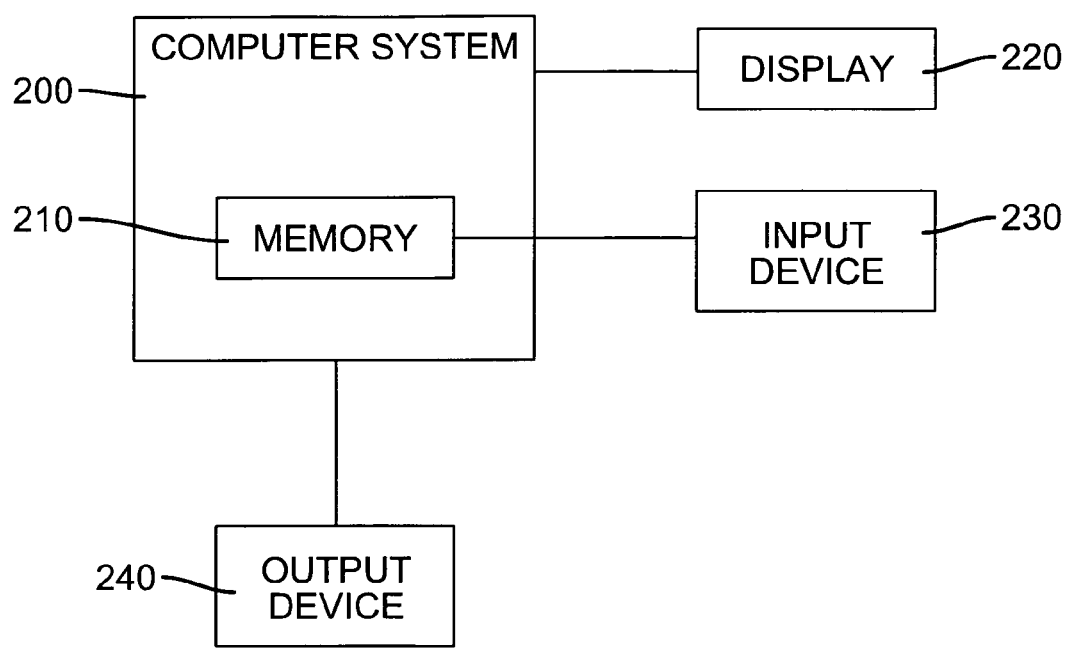
FIG. 7 depicts a system of the invention.

Many different equipment types can be used to achieve the method of the invention, as shown in FIG. 7. For example, any computer system 200 with memory 210 and capable of accepting image data as input can be used in this method. Examples of computer systems include desktop or laptop computers, kiosks, and minilabs. The computer can be networked or independent. The computer can be a part of an imaging apparatus such as a camera, directly connected to an imaging apparatus, or capable of accepting input from an imaging apparatus, portable memory storage device, or a network such as the Internet. As needed, the computer can include one or more USB port, serial port, portable memory device reader, or network connection.

A display 220 can be used to view the original color image and the adjusted color image, simultaneously or in sequence. The display can be part of the computer system, or communicate therewith to receive the image data to be displayed. Examples of displays include monitors, for example, cathode ray tube (CRT) and liquid crystal display (LCD) monitors, televisions, camera display screens, printer displays screens, mobile phone display screens, and other display screens of any type, including LCD, organic light emitting diode (OLED), CRT, and others.

The computer system can include or be communicably connected to an input device 230, wherein the input device is capable of accepting at least one color image for adjustment. The input device can be communicably connected to the memory of the computer. Suitable input devices can include, but are not limited to, a disk drive, compact disc (CD) drive, digital video disc (DVD) drive, portable memory reader, universal serial bus (USB) port, infrared port, wifi receiver, optical data scanner or receiver, and a network connection, such as an internet, wide area network (WAN), or local area network (LAN) connection.

The computer system can also include an output device 240 for the original or adjusted color image. The output device can be part of or communicably linked to the computer system. Examples of suitable output devices include, but are not limited to, a printer, a photographic print device, a copier, a portable memory device, a disk, a CD, a DVD, a memory location, or a network location. Suitable printers can include thermal, ink jet, and laser printers, whether of consumer, commercial, or professional grade. Photographic print devices can include those typically found in minilabs and photographic labs, as well as stand-alone devices.

Once an image for color adjustment is received through the input device and placed in memory, the computer system analyzes at least a first portion of the color image in memory to determine a color value representative of the first portion color. As part of determining a representative color value, the computer can desaturate the first portion of the image before analyzing the first portion to determine a color value, and resaturate the color value. Using the color value, the computer then determines a color adjustment parameter for the color value to adjust the color value to the desired color value. The color adjustment parameter can be applied to at least the first portion of the image stored in the memory. Before applying the color adjustment parameter, the computer can identify at least a second portion of the image wherein the second portion has a color value extreme, analyze the second portion to determine a color value representative of the color value extreme, and use the second portion color value to check the color adjustment parameter such that the color value extreme is not clipped, or lost, once the image is adjusted by the color adjustment parameter.

Any of the above steps can be conducted by the computer based on pre-programmed instructions, or can include user input. For example, the first portion, second portion, and any other portions of the image to be analyzed can be identified by a program, such as but not limited to face recognition, shape recognition, subject matter recognition, color recognition, or image segmentation. Alternately, the first portion, second portion, or both can be a predetermined area, for example, a geometric shape occupying a certain position within the image. Alternately, a user can select a portion of the image for analysis by pointing with a mouse, touching a screen, or drawing or dropping a shape around the designated area to be analyzed.

The representative color value of a portion of the image can be determined automatically based on a preset value to be selected. The representative color value can be determined by a program that statistically determines which color value best represents the image portion color value in view of the portion of the image sampled and the certainty that portion represents the desired color value. The representative color value can be overridden by a user, or selected by a user. For example, a color value or a range of color values can be presented numerically, visually, or both to the user, with or without recommendation by the computer of a representative color value. The program can be designed such that the user can select the suggested representative color value, choose one of the color values shown, or enter a distinct color value that may differ from all of the above.

The computer can be programmed to show the user sample adjusted images using various color adjustment parameters based on the computer generated parameter, user generated parameter, using various techniques of generating the parameter as discussed herein, or some combination thereof, allowing the user to select the adjusted image which visually appears best for the intended purpose.

The user can also have input on the color value extreme. This can be useful if there are extremes of saturation, brightness, or both, and there are portions of the image the user does not mind clipping, while other areas are of more importance. For example, in a photographic ID image, the coloration and distinctions in the facial features should be maintained as close to the original as possible, while the coloration or brightness of the clothing is not as important. In contrast, for a fashion design catalog, the model's face would not be important, whereas the saturation, hue, or brightness level of the clothing may be important to maintain. Thus, identification of a portion of the image including a coloration or characteristic to be maintained can be useful. Alternately, this can be determined by the computer using face recognition, shape recognition, subject matter recognition, color recognition, or image segmentation, or by analyzing a preset identified portion, such as a geometric shape occupying a certain position within the image.

EXAMPLES

1. Adjustment of Photographic Identification Image

A photographic ID image is adjusted in RGB color space as follows, where the maximum color value is achieved on the subject's shirt:

| INITIAL: | Red | Green | Blue |
|---|---|---|---|
| Background | 232 | 228 | 221 |
| Subject's Shirt | 242 | 117 | 134 |

Using the above values, to scale the background to white (255,255,255), irrespective of the remainder of the image, requires a color adjustment parameter of 1.099 for the red channel. However, using this color adjustment parameter would result in the maximum color value among the three channels of the subject's shirt, the red color value, having an adjusted color value of 265, indicating this color value would be clipped to 255. To ensure the color value of the shirt is not clipped, the color adjustment parameter is reduced to 1.054, providing the following final values:

| ADJUSTED: | Red | Green | Blue |
|---|---|---|---|
| Background | 245 | 240 | 233 |
| Subject's Shirt | 255 | 123 | 141 |

This makes the background more white, while maintaining the color value of the subject's shirt.

A more complete adjustment identifies a color adjustment parameter for each channel, wherein the color adjustment parameter for the red channel is of 1.099, for the green channel is 1.118, and for the blue channel is 1.154. However, again, using these color adjustment parameters would result in the subject's shirt having a red color value of 265, indicating this color value would be clipped to 255. To ensure the color value of the shirt is not clipped, the color adjustment parameter for the red channel is reduced to 1.054, providing an adjusted color value of 245. The color adjustment parameters for the green and blue channel are then determined by multiplying the respective color adjustment parameter by the ratio of the modified red color adjustment parameter to the original red color adjustment parameter, 1.054/1.099. This provides the following values:

| ADJUSTED: | Red | Green | Blue |
|---|---|---|---|
| Background | 245 | 245 | 245 |
| Subject's Shirt | 255 | 129 | 149 |

2. Using Linear Reflectance Values

The color values of the color space are converted to linear reflectance values for ease of manipulation. Use of linear reflectance, log eflectance, linear radiance, log radiance, or linear density can increase the accuracy of the color adjustment. As an example, in an 8-bit system using RGB color space, a red value is converted to linear reflectance, then adjusted to 1.0. The adjusted linear reflectance value is then be converted back to RGB space.

|  | Red | Linear reflectance |
|---|---|---|
| Initial Value: | 200 | 0.5147 |
| Desired Value | 255 | 1.0 |
| Color Adjustment Parameter | 1.275 | 1.943 |

3. Desaturation

Desaturation does improve the accuracy of the analysis of the first portion representative color value. For example, the true background color of a photographic identification image in an RGB color space is (232 228 221), but the subject's shirt is a pink color (242 117 134), which might influence the analysis of the representative background color by producing a Red channel representative color value that is too high.

To deemphasize the color value of the shirt in the first portion analysis, given that the color values of the shirt in the other two channels are significantly different from the red channel color value, the color value of all channels is moved toward their average, that is, desaturated, before analyzing the first portion representative color value. The amount of desaturization can be chosen based on image samples or experimentation so as to sufficiently deemphasize any undesirable features. In this instance, a saturation factor of ⅓ is used to desaturate the color values, making the pink color of the shirt (190 149 154), which no longer has any color values above that of the background color.

4. Color Space Normalization in Desaturation/Resaturization

In a color space having a reference white of unequal values, for example, an RGB space with reference white of ($R_N$ $G_N$ $B_N$), a normalization matrix is included in a linear reflectance conversion matrix multiplication for desaturation (one-third exemplified) and resaturation as follows, wherein $R_{in}$, $G_{in}$, $B_{in}$ are the initial color values, and $R_{out}$, $G_{out}$, $B_{out}$ are the adjusted color values:

$$\underbrace{\begin{bmatrix} Rout \\ Gout \\ Bout \end{bmatrix}}_{\substack{Output \\ Color}} = \underbrace{\begin{bmatrix} R_N & 0 & 0 \\ 0 & G_N & 0 \\ 0 & 0 & B_N \end{bmatrix}}_{Denormalize}$$

$$\underbrace{\begin{bmatrix} 0.5555 & 0.2222 & 0.2222 \\ 0.2222 & 0.5555 & 0.2222 \\ 0.2222 & 0.2222 & 0.5555 \end{bmatrix}}_{Desaturate} \underbrace{\begin{bmatrix} 1/R_N & 0 & 0 \\ 0 & 1/G_N & 0 \\ 0 & 0 & 1/B_N \end{bmatrix}}_{Normalize} \underbrace{\begin{bmatrix} Rin \\ Gin \\ Bin \end{bmatrix}}_{\substack{Input \\ Color}}$$

$$\underbrace{\begin{bmatrix} Rout \\ Gout \\ Bout \end{bmatrix}}_{\substack{Output \\ Color}} = \underbrace{\begin{bmatrix} R_N & 0 & 0 \\ 0 & G_N & 0 \\ 0 & 0 & B_N \end{bmatrix}}_{Denormalize} \underbrace{\begin{bmatrix} 2.3333 & -0.6667 & -0.6667 \\ -0.6667 & 2.3333 & -0.6667 \\ -0.6667 & -0.6667 & 2.3333 \end{bmatrix}}_{Resaturate}$$

$$\underbrace{\begin{bmatrix} 1/R_N & 0 & 0 \\ 0 & 1/G_N & 0 \\ 0 & 0 & 1/B_N \end{bmatrix}}_{Normalize} \underbrace{\begin{bmatrix} Rin \\ Gin \\ Bin \end{bmatrix}}_{\substack{Input \\ Color}}$$

5. Color Space Conversion in Desaturization/Resaturization

In an RGB color space, the color values are converted to a luminance-chrominance system for use in desaturation, and then converted back to the RGB color space for use in analyzing the first portion representative color value. After determining the representative color value, the representative color value is converted to a luminance-chrominance system for use in resaturation, and then converted back to the RGB color space for use determining the color adjustment parameters. This can be done by matrix multiplication, as shown below. Desaturation by one-third, and resaturation (multiplier of three) are shown as an example.

Desaturation:

$$\begin{bmatrix} Rout \\ Gout \\ Bout \end{bmatrix}_{\text{Output Color}} = \begin{bmatrix} 0.5774 & -0.4082 & -0.7071 \\ 0.5774 & 0.8165 & 0.0000 \\ 0.5774 & -0.4082 & 0.7071 \end{bmatrix}_{\text{Convert\_LCC\_to\_RGB}}$$

$$\begin{bmatrix} 1 & 0 & 0 \\ 0 & 1/3 & 0 \\ 0 & 0 & 1/3 \end{bmatrix}_{\text{Desaturate}} \begin{bmatrix} 0.5774 & 0.5774 & 0.5774 \\ -0.4082 & 0.8165 & -0.4082 \\ -0.7071 & 0.0000 & 0.7071 \end{bmatrix}_{\text{Convert\_RBG\_to\_LCC}} \begin{bmatrix} Rin \\ Gin \\ Bin \end{bmatrix}_{\text{Input Color}}$$

wherein the above matrix multiplication is equivalent to:

$$\begin{bmatrix} Rout \\ Gout \\ Bout \end{bmatrix}_{\text{Output Color}} = \begin{bmatrix} 0.5555 & 0.2222 & 0.2222 \\ 0.2222 & 0.5555 & 0.2222 \\ 0.2222 & 0.2222 & 0.5555 \end{bmatrix}_{\text{Desaturate}} \begin{bmatrix} Rin \\ Gin \\ Bin \end{bmatrix}_{\text{Input Color}}$$

Resaturation:

$$\begin{bmatrix} Rout \\ Gout \\ Bout \end{bmatrix}_{\text{Output Color}} = \begin{bmatrix} 0.5774 & -0.4082 & -0.7071 \\ 0.5774 & 0.8165 & 0.0000 \\ 0.5774 & -0.4082 & 0.7071 \end{bmatrix}_{\text{Convert\_LCC\_to\_RGB}}$$

$$\begin{bmatrix} 1 & 0 & 0 \\ 0 & 3 & 0 \\ 0 & 0 & 3 \end{bmatrix}_{\text{Desaturate}} \begin{bmatrix} 0.5774 & 0.5774 & 0.5774 \\ -0.4082 & 0.8165 & -0.4082 \\ -0.7071 & 0.0000 & 0.7071 \end{bmatrix}_{\text{Convert\_RBG\_to\_LCC}} \begin{bmatrix} Rin \\ Gin \\ Bin \end{bmatrix}_{\text{Input Color}}$$

wherein the above matrix multiplication is equivalent to:

$$\begin{bmatrix} Rout \\ Gout \\ Bout \end{bmatrix}_{\text{Output Color}} = \begin{bmatrix} 2.3333 & -0.6667 & -0.6667 \\ -0.6667 & 2.3333 & -0.6667 \\ -0.6667 & -0.6667 & 2.3333 \end{bmatrix}_{\text{Resaturate}} \begin{bmatrix} Rin \\ Gin \\ Bin \end{bmatrix}_{\text{Input Color}}.$$

The invention has been described with reference to specific examples, including specific methods and equipment, however, it will be appreciated that variations and modifications can be effected by a person of ordinary skill in the art without departing from the scope of the invention.

PARTS LIST

100 Step of inputting image
110 Step of identifying first portion of image
120 Step of desaturating first portion of image
130 Step of determining representative color value
140 Step of resaturating representative color value
150 Step of identifying second portion of image
160 Step of determining color value extreme of second portion of image
170 Step of determining color adjustment parameter
180 Step of applying color adjustment parameter
200 Computer System
210 Memory
220 Display
230 Input Device
240 Output Device It is claimed:

1. A method of adjusting a color in a digital image to a desired color value, comprising:
   identifying at least a first portion of the image, wherein the first portion comprises the color;
   analyzing the first portion to determine a color value representative of a first portion color;
   determining a color adjustment parameter for the color value to adjust the color value to the desired color value;
   applying the color adjustment parameter to at least the first portion of the image;
   wherein the method further comprises one or more of:
   performing a desaturation of the first portion of the image before analyzing the first portion to determine a color value, and resaturating the color value; and
   identifying at least a second portion of the image, wherein the second portion has a color value extreme, analyzing the second portion to determine a color value representative of the color value extreme, and using the second portion color value in determining the color adjustment parameter.

2. The method of claim 1, wherein the color is a neutral color.

3. The method of claim 1, wherein the desired color adjustment is whitening or blackening.

4. The method of claim 1, wherein the first portion of the image is all of the image, a predetermined area of the image, a user-designated area of the image, or a combination thereof.

5. The method of claim 1, wherein the first portion of the image is between 10% and 90% of the image, contiguous or non-contiguous.

6. The method of claim 1, wherein the second portion of the image is not the first portion of the image.

7. The method of claim 1, wherein the second portion of the image is a user-designated area of the image, a predetermined area, or a combination thereof.

8. The method of claim 1, wherein analyzing the first portion of the image or the second portion of the image comprises taking a histogram.

9. The method of claim 1, wherein identifying the first portion of the image or the second portion of the image comprises autodetecting image subject matter.

10. The method of claim 9, wherein autodetecting image subject matter comprises one or more of face detection, pattern detection, scene detection or segmentation.

11. The method of claim 1, wherein the image is a photographic identification image.

12. The method of claim 1, wherein performing the desaturation of the first portion of the image comprises:
   identifying a saturation extreme of the first portion of the image; and
   tuning the desaturation to account for the saturation extreme.

13. The method of claim 1, wherein analyzing the first portion of the image or the second portion of the image comprises taking a mean.

14. The method of claim 1, wherein the digital image comprises pixels, and applying the color adjustment parameter comprises:
   analyzing each pixel in at least the first portion of the image to determine each pixel color value;
   determining if each pixel color value is within a predetermined range from the representative color value; and
   applying the color adjustment parameter to each pixel value within a predetermined range from the representative color value.

15. A method of adjusting a color in a digital image to a desired color value, comprising:
   identifying at least a first portion of the image, wherein the first portion comprises the color;
   analyzing the first portion to determine a color value representative of a first portion color in at least one color channel;
   determining a color adjustment parameter for the color value in each of the at least one color channel to adjust the color value to the desired color;
   applying the color adjustment parameter in each of the respective at least one color channel to at least the first portion of the image;
   wherein the method further comprises one or more of:
   performing a desaturation of the first portion of the image in each of the at least one color channel before analyzing the first portion to determine a color value in each of the at least one color channel, and resaturating the color value in each of the at least one color channel; and
   identifying at least a second portion of the image, wherein the second portion has a color value extreme, analyzing the second portion to determine a color value representative of the color value extreme in each of the at least one color channel, using the second portion color value for each of the at least one channel in determining the color adjustment parameter for each of the respective at least one color channel.

16. A system for adjusting a color image, comprising:
   a computer having a memory for storing at least one color image and at least one adjusted color image;
   a display for displaying at least one color image, at least one adjusted color image, or both;
   an input device for accepting at least one color image for adjustment, wherein the input device is communicably connected to the memory;
   an output device for the at least one adjusted color image;
   wherein the computer analyzes at least a first portion of at least one color image in memory from the input device, wherein the first portion comprises a color for adjustment; analyzes the first portion to determine a color value representative of a first portion color; determines a color adjustment parameter for the color value to adjust the color value to a desired color value; and applies the color adjustment parameter to at least the first portion of the image stored in the memory; and
   wherein the computer performs one of the following:
   further desaturates the first portion of the image before analyzing the first portion to determine a color value, and resaturates the color value; or
   identifies at least a second portion of the image wherein the second portion has a color value extreme, analyzes the second portion to determine a color value representative of the color value extreme, and uses the second portion color value in determining the color adjustment parameter.

17. The system of claim 16, wherein the input device is a portable memory device reader, a network connection, or an image capture device.

18. The system of claim 16, wherein the input device is an image capture device associated with a background and a lighting source.

19. The system of claim 16, wherein the color value is respectively determined and adjusted in two or more color channels.

* * * * *

UNITED STATES PATENT AND TRADEMARK OFFICE
CERTIFICATE OF CORRECTION

PATENT NO. : 7,679,786 B2  
APPLICATION NO. : 11/470618  
DATED : March 16, 2010  
INVENTOR(S) : Scott et al.

Page 1 of 1

It is certified that error appears in the above-identified patent and that said Letters Patent is hereby corrected as shown below:

| Issued Patent | | Description of Error |
|---|---|---|
| Column | Line | |
| 16 | 65 | In Claim 10, after "detection" insert --,--. |
| 17 | 30 (Approx.) | In Claim 15, delete "color;" and insert --color value;--, therefor. |

Signed and Sealed this  
Eighth Day of March, 2011

David J. Kappos  
*Director of the United States Patent and Trademark Office*